(12) United States Patent
Tagashira et al.

(10) Patent No.: US 9,939,518 B2
(45) Date of Patent: Apr. 10, 2018

(54) SAFETY SCANNER

(71) Applicant: Keyence Corporation, Osaka (JP)

(72) Inventors: Tsuyoshi Tagashira, Osaka (JP); Kentaro Yamazaki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/410,799

(22) Filed: Jan. 20, 2017

(65) Prior Publication Data
US 2017/0242111 A1 Aug. 24, 2017

(30) Foreign Application Priority Data
Feb. 22, 2016 (JP) .................. 2016-031514

(51) Int. Cl.
| | | |
|---|---|---|
| G01B 11/14 | (2006.01) | |
| G01S 7/51 | (2006.01) | |
| G01S 7/481 | (2006.01) | |
| G01S 17/02 | (2006.01) | |
| G01S 17/42 | (2006.01) | |
| H04N 7/18 | (2006.01) | |
| G08B 13/196 | (2006.01) | |

(52) U.S. Cl.
CPC .............. *G01S 7/51* (2013.01); *G01S 7/4817* (2013.01); *G01S 17/023* (2013.01); *G01S 17/42* (2013.01); *H04N 7/185* (2013.01); *G08B 13/19604* (2013.01); *G08B 13/19613* (2013.01)

(58) Field of Classification Search
CPC ....... G01B 11/00; G01B 11/024; G01B 11/02; G01B 11/26; H05K 13/0413
USPC .......................................... 356/615
See application file for complete search history.

(56) References Cited

U.S. PATENT DOCUMENTS

| | | | |
|---|---|---|---|
| 6,616,044 B1 * | 9/2003 | Gu ................. | G06K 7/10584 235/462.14 |
| 7,598,484 B2 | 10/2009 | Yamaguchi | |
| 8,063,780 B2 | 11/2011 | Onishi | |
| 8,069,007 B2 | 11/2011 | Oh | |
| 8,248,235 B2 | 8/2012 | Inoue et al. | |
| 8,319,171 B2 | 11/2012 | Kawabata | |
| 8,330,095 B2 | 12/2012 | Kawabata | |
| 8,415,609 B2 | 4/2013 | Kawabata et al. | |
| 8,648,292 B2 | 2/2014 | Kawabata et al. | |
| 2003/0179350 A1* | 9/2003 | Hecht ................. | G06K 7/10584 353/122 |
| 2008/0158555 A1* | 7/2008 | Mori ................. | G01S 7/481 356/239.2 |
| 2009/0283666 A1 | 11/2009 | Tagashira | |
| 2009/0295577 A1 | 12/2009 | Yamaguchi | |

(Continued)

*Primary Examiner* — Tarifur Chowdhury
*Assistant Examiner* — Md M Rahman
(74) *Attorney, Agent, or Firm* — Kilyk & Bowersox, P.L.L.C.

(57) ABSTRACT

Provided is a safety scanner that enables simplification of an operation of checking an operating state. The safety scanner includes a scan image generation section that generates a scan image that includes a plurality of sets of distance measurement information obtained by performing scanning with a detection light emitted by an emitter, the plurality of sets of distance measurement information being represented as a plurality of distance measurement positions on a scanning plane of the detection light, and a monitoring image display that displays the scan image on a screen.

12 Claims, 14 Drawing Sheets

(56) References Cited

U.S. PATENT DOCUMENTS

| | | | |
|---|---|---|---|
| 2010/0149330 A1* | 6/2010 | Salgar | G08B 13/19686 348/143 |
| 2015/0369618 A1* | 12/2015 | Barnard | H05B 37/0272 701/491 |
| 2016/0155306 A1 | 6/2016 | Kawanaka et al. | |
| 2016/0163171 A1 | 6/2016 | Yamazaki et al. | |
| 2017/0242099 A1 | 8/2017 | Yamazaki | |
| 2017/0242101 A1 | 8/2017 | Oh | |
| 2017/0242110 A1 | 8/2017 | Tomoshi et al. | |
| 2017/0242123 A1 | 8/2017 | Yamazaki et al. | |

* cited by examiner

FIG. 11A

| INPUT/OUTPUT STATE | | | |
|---|---|---|---|
| INPUT 1 | ON | INPUT 6 | ON |
| INPUT 2 | ON | INPUT 7 | ON |
| INPUT 3 | ON | INPUT 8 | ON |
| INPUT 4 | ON | INPUT 9 | ON |
| INPUT 5 | ON | INPUT 10 | ON |
|  | ▼ | ▲ |  |

FIG. 11B

| INPUT/OUTPUT STATE | | | |
|---|---|---|---|
| OSSD 1/2 | ON | OSSD 3/4 | ON |
| AUX 1 | ON | AUX 4 | ON |
| AUX 2 | ON | AUX 5 | ON |
| AUX 3 | ON | AUX 6 | ON |
|  |  |  |  |
|  | ▼ | ▲ |  |

SAFETY SCANNER

CROSS-REFERENCE TO RELATED APPLICATIONS

The present application claims foreign priority based on Japanese Patent Application No. 2016-031514, filed Feb. 22, 2016, the contents of which is incorporated herein by reference.

BACKGROUND OF THE INVENTION

1. Field of the Invention

The present invention relates to a safety scanner and, more particularly, to an improvement of a safety scanner that receives reflected light from an object within a detection area to sense an intruder within a protection area.

2. Description of Related Art

An optical safety sensor is an area monitoring device which optically senses an intruder such as a person intruded into a protection area and outputs a safety control signal for emergently stopping a machine tool or an industrial robot (e.g., JP 2009-296087 A and JP 2009-294734 A).

For example, a safety scanner is an optical scanning area monitoring device provided with a light emitting part which emits detection light toward an object, a light receiving part which receives reflected light from the object and generates a light receiving signal, a distance calculation part which obtains a distance to the object on the basis of the light receiving signal, and a scanning part which causes the detection light to perform scanning in the circumferential direction around a rotation axis. Sensing of an intruder is performed by identifying the position of an object from the distance to the object and a scanning angle of the detection light and checking the identified position against a protection area.

Setting data which includes area designation information designating the protection area and measurement setting information designating a measurement condition is created using a setting support device. An information processing terminal such as a personal computer is used as the setting support device. The setting support device is capable of acquiring distance measurement information from the safety scanner and displaying the acquired distance measurement information on a screen. For example, in the setting support device, a scan image which includes a plurality of distance measurement information items obtained by performing scanning with the detection light, the plurality of distance measurement information items being represented as a plurality of distance measurement positions on a scanning plane of the detection light, is displayed. Many distance measurement information items can be promptly grasped by displaying such a scan image.

However, in a conventional optical safety system, in order to check a plurality of distance measurement information items obtained by performing scanning with the detection light, it is necessary to connect the safety scanner to the setting support device. Thus, disadvantageously, an operation of checking an operating state such as whether or not the safety scanner is correctly installed or whether or not the safety scanner is appropriately operating is troublesome.

SUMMARY OF THE INVENTION

The present invention has been made in view of the above circumstances, and an object thereof is to provide a safety scanner that enables simplification of an operation of checking an operating state.

According to one embodiment of the invention, a safety scanner includes a light emitting section that emits detection light to a detection area; a light receiving section that receives reflected light from an object within the detection area and generates a light receiving signal; a distance calculation section that obtains a distance to the object on the basis of the light receiving signal; a scanning section that causes the detection light to perform scanning in a circumferential direction around a rotation axis; a distance measurement section that obtains distance measurement information corresponding to the distance and a scanning angle of the detection light; an intrusion sensing section that senses an intruder within a protection area on the basis of distance measurement information and outputs a sensing signal; an indicator lamp that indicates an output state of the sensing signal; a scan image generation section that generates a scan image that includes a plurality of distance measurement information items obtained by performing scanning with the detection light, the plurality of distance measurement information items being represented as a plurality of distance measurement positions on a scanning plane of the detection light; and a monitoring image display section that displays the scan image on a screen.

According to such a configuration, the scan image in which a plurality of distance measurement information items are indicated on the scanning plane is displayed in the safety scanner. Thus, it is possible to check a plurality of distance measurement information items which are obtained by performing scanning with the detection light without connecting the safety scanner to the setting support device. Therefore, it is possible to simplify an operation of checking an operating state such as whether or not the safety scanner is correctly installed or whether or not the safety scanner is appropriately operating.

According to another embodiment of the invention, in the safety scanner, in addition to the above configuration, the monitoring image display section displays the protection area on the scan image. According to such a configuration, the distance measurement position of an object can be easily compared with the protection area. Thus, it is possible to easily identify whether or not the safety scanner is correctly installed or whether or not the safety scanner is appropriately operating.

According to still another embodiment of the invention, in addition to the above configuration, the safety scanner further includes an imaging section that captures an image of the detection area to generate a camera image and a switching instruction receiving section that receives a switching instruction, and the monitoring image display section switches a display image between the scan image and the camera image in accordance with the switching instruction.

According to such a configuration, the positional relationship between an object on the scan image and the protection area can be checked using the camera image. Thus, it is possible to easily identify whether or not the protection area is correctly set.

According to still another embodiment of the invention, in the safety scanner, in addition to the above configuration, the monitoring image display section displays the plurality of distance measurement positions on the camera image. According to such a configuration, it is possible to check what kind of object an object on the scan image is in the real space using the camera image.

According to still another embodiment of the invention, in the safety scanner, in addition to the above configuration, the scan image is a moving image, and the scan image generation section updates the scan image synchronously with a scanning period of the detection light. According to such a configuration, it is possible to check a change in the environment around the safety scanner in real time.

According to still another embodiment of the invention, in addition to the above configuration, the safety scanner further includes a capture signal receiving section that receives a capture signal and a history information storage section that stores the scan image as history information in accordance with the capture signal. According to such a configuration, it is possible to identify a peripheral state at the time of receiving the capture signal by checking the scan image stored as the history information.

According to still another embodiment of the invention, in the safety scanner, in addition to the above configuration, the monitoring image display section displays the scan image with a lower direction of the screen aligned with a front direction of the safety scanner. According to such a configuration, a user who faces the front side of the safety scanner can intuitively grasp the correspondence relationship between the distance measurement position on the scan image and the position in the real space.

According to still another embodiment of the invention, in the safety scanner, in addition to the above configuration, the scan image is a line image formed of a polygonal line that chronologically connects the plurality of distance measurement positions that are sequentially acquired. According to such a configuration, it is possible to easily grasp the positional relationship between many distance measurement positions and the safety scanner.

According to the present invention, a plurality of distance measurement information items which are obtained by performing scanning with the detection light can be checked without connecting the safety scanner to the setting support device. Thus, it is possible to provide the safety scanner that simplifies an operation of checking an operating state.

BRIEF DESCRIPTION OF THE DRAWINGS

FIGS. 11A and 11B are diagrams illustrating an example of the operation of the display unit of FIG. 4 and illustrate check screens which are displayed when a menu item "INPUT/OUTPUT STATE" is selected;

DETAILED DESCRIPTION OF PREFERRED EMBODIMENT

First, a schematic configuration of an optical safety system as a premise of the present invention will be described below with reference to FIGS. 1 and 2.

<Optical Safety System 1>

Figure 1:
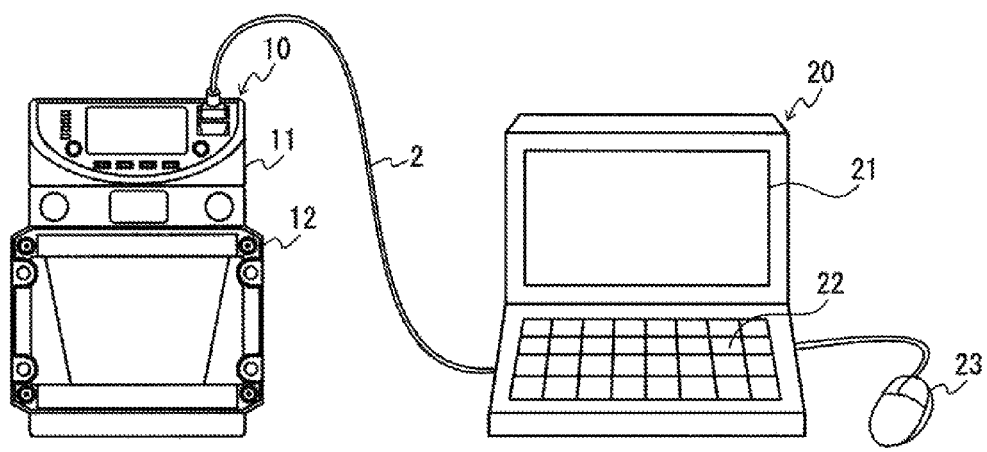
FIG. 1 is a system diagram illustrating a configuration example of an optical safety system including a safety scanner according to an embodiment of the present invention.

FIG. 1 is a system diagram illustrating a configuration example of an optical safety system 1 including a safety scanner 10 according to an embodiment of the present invention. The optical safety system 1 includes the safety scanner 10 which senses an intruder within a protection area and outputs a sensing signal, and a setting support device 20 which generates setting data for the safety scanner. The safety scanner 10 and the setting support device 20 are connected to each other through a communication cable 2.

The sensing signal is a safety control signal for emergently stopping a machine such as a machine tool or an industrial robot. The sensing signal is output to a safety control device (not illustrated) which controls the machine, for example, to a programmable logic controller (PLC). The operation of a machine as a control target of the safety control device can be stopped by switching an output state of the sensing signal to an off state.

The protection area is a monitoring target area of intruder sensing. For example, an area around machinery and equipment such as a work area of a machine tool or an industrial robot or a moving area of a conveyance vehicle is designated as the protection area.

The safety scanner 10 is an optical scanning safety sensor which optically senses an intruder within the protection area, and includes a display unit 11 and a measurement unit 12. The display unit 11 is a user interface which receives a user operation and displays, for example, an operating state and setting data and provided with a connection port for the communication cable 2 and an output port for a safety control signal.

The measurement unit 12 is a sensor head unit which emits detection light to a detection area and receives reflected light from an object within the detection area to sense an intruder. The detection area is the largest area detectable by the measurement unit 12. The protection area is an area designated within the detection area. The measurement unit 12 is provided with a rotary optical system which causes detection light to perform scanning in the circumferential direction around a rotation axis and a camera which captures an image of the detection area to generate a camera image.

A warning area can be set to the safety scanner 10 in addition to the protection area. When the safety scanner 10 senses an intruder within the warning area, the safety scanner 10 outputs an auxiliary output signal and performs user notification by, for example, lighting an indicator lamp.

For example, the measurement unit 12 is placed on a horizontal floor surface. The display unit 11 includes an output signal switching device (OSSD). When no intruder is present within the protection area, the OSSD is in an on state, and a sensing signal of an on state is output. On the other hand, when an intruder is present within the protection area, the OSSD is in an off state, and a sensing signal of an off state is output.

The setting support device 20 is an information processing terminal, for example, a personal computer which is provided with a display 21, a keyboard 22, and a mouse 23. For example, the setting support device 20 creates setting data for designating the protection area and a measurement condition. The setting data includes area designation information for designating the protection area and measurement setting information for designating the measurement condition. Further, the setting support device 20 performs an operation of acquiring distance measurement information and a camera image from the safety scanner 10 and displaying the acquired information and image on the display 21.

<Safety Scanner 10>

Figure 2:
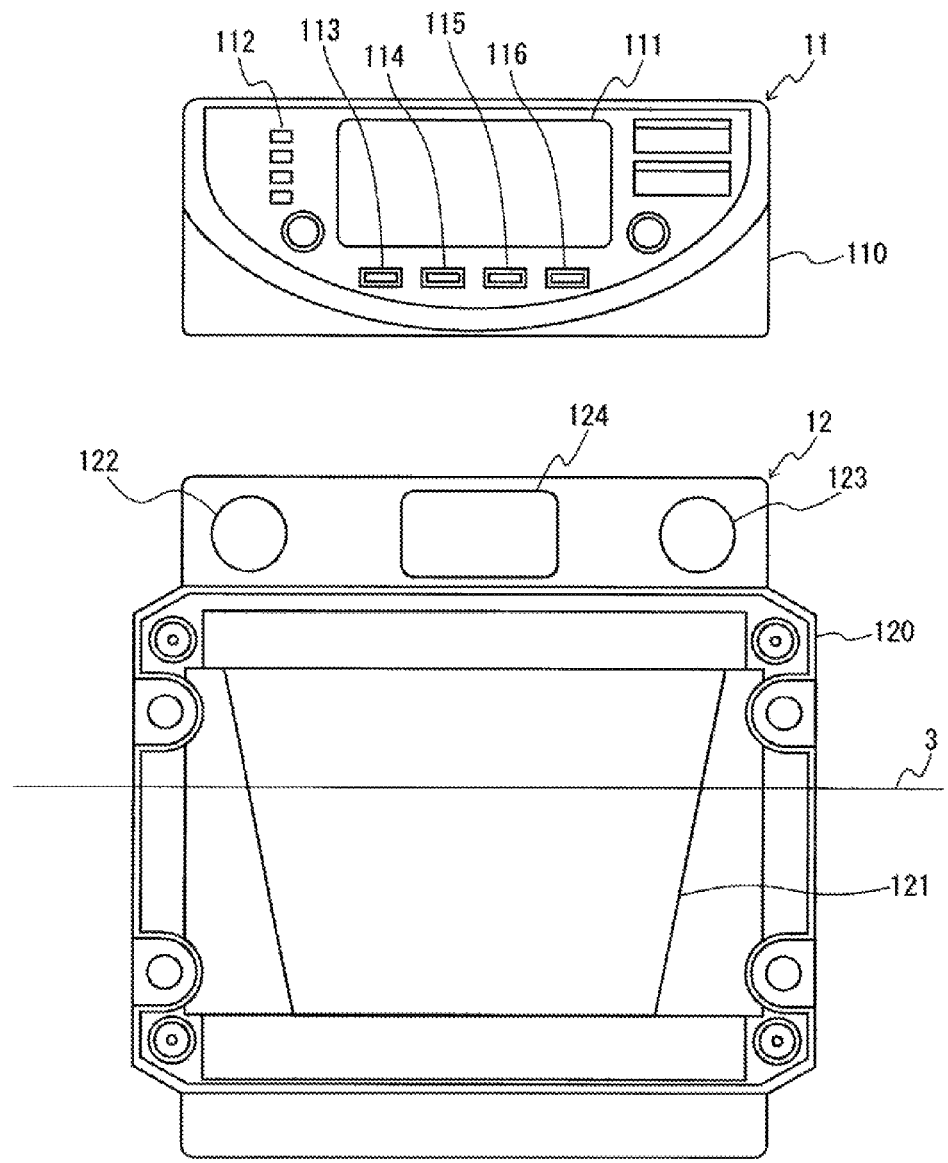
FIG. 2 is a diagram illustrating a configuration example of the safety scanner of FIG. 1.

FIG. 2 is a diagram illustrating a configuration example of the safety scanner 10 of FIG. 1 and illustrates a separate type safety sensor which includes the display unit 11 separable from the measurement unit 12. FIG. 2 illustrates the safety scanner 10 viewed from the front side. The display unit 11 and the measurement unit 12 are connected to each other through a wiring cable (not illustrated). Two or more measurement units 12 can be connected to the display unit 11 at the same time.

A scanner casing 120 of the measurement unit 12 houses the rotary optical system which emits detection light in the horizontal direction and causes the detection light to perform scanning along a horizontal scanning plane 3, and a protective cover 121 for protecting the rotary optical system is attached to a housing part for the rotary optical system. The scanning plane 3 is a plane perpendicular to the rotation axis of the rotary optical system.

For example, laser light having a wavelength in an infrared range is used as the detection light. The detection light repeatedly performs scanning at a constant scanning period. The scanner casing 120 is provided with two fixed cameras 122 and 123, and an indicator 124 which indicates an output state of the sensing signal. The fixed cameras 122, 123 and the indicator 124 are disposed above the housing part for the rotary optical system.

Both the fixed cameras 122 and 123 are imaging devices which capture an image of the detection area to generate a camera image and disposed with different orientations. The fixed camera 122 is disposed on the left side with respect to the indicator 124 when viewed from the side facing the measurement unit 12. On the other hand, the fixed camera 123 is disposed on the right side with respect to the indicator 124 when viewed from the side facing the measurement unit 12. That is, the fixed cameras 122 and 123 are disposed at different positions in the circumferential direction with respect to the rotation axis of the rotary optical system. The fixed camera 122 is a camera whose angle of view includes a right side area with respect to the front-rear direction viewed from the measurement unit 12, and the fixed camera 123 is a camera whose angle of view includes a left side area with respect to the front-rear direction viewed from the measurement unit 12. The fixed cameras 122 and 123 are disposed above the scanning plane 3 and thus capable of obtaining a camera image of a bird's eye view of the scanning plane 3.

The fixed cameras 122 and 123 preferably capture not only an image of the protection area, but also an image of the periphery of the protection area. More preferably, the fixed cameras 122 and 123 capture images of an area settable as the warning area and the periphery thereof.

The indicator 124 is an indicator lamp which indicates an output state and an operating state of the sensing signal. The indicator 124 is lit in different colors according to the output state of the sensing signal. For example, the indicator 124 is lit in red when the OSSD is in an off state and lit in green when the OSSD is in an on state.

The display unit 11 is disposed on the upper face of the measurement unit 12. The display casing 110 of the display unit 11 is provided with a display panel 111, an indicator 112, and operation keys 113 to 116.

The display panel 111 is a display device which screen-displays, for example, an operating state, distance measurement information, a camera image, and setting data. For example, the display panel 111 is a liquid crystal display (LCD) panel. The indicator 112 is an indicator lamp for indicating, for example, an operating state and an output state of the sensing signal. The display unit 11 communicates with the measurement unit 12 and is capable of checking the operation state and a sensing history of an intruder even when placed at a position away from the measurement unit 12.

Next, a more detailed configuration of the safety scanner 10 according to the present invention will be described below with reference to FIGS. 3 to 15.

<Measurement Unit 12>

Figure 3:
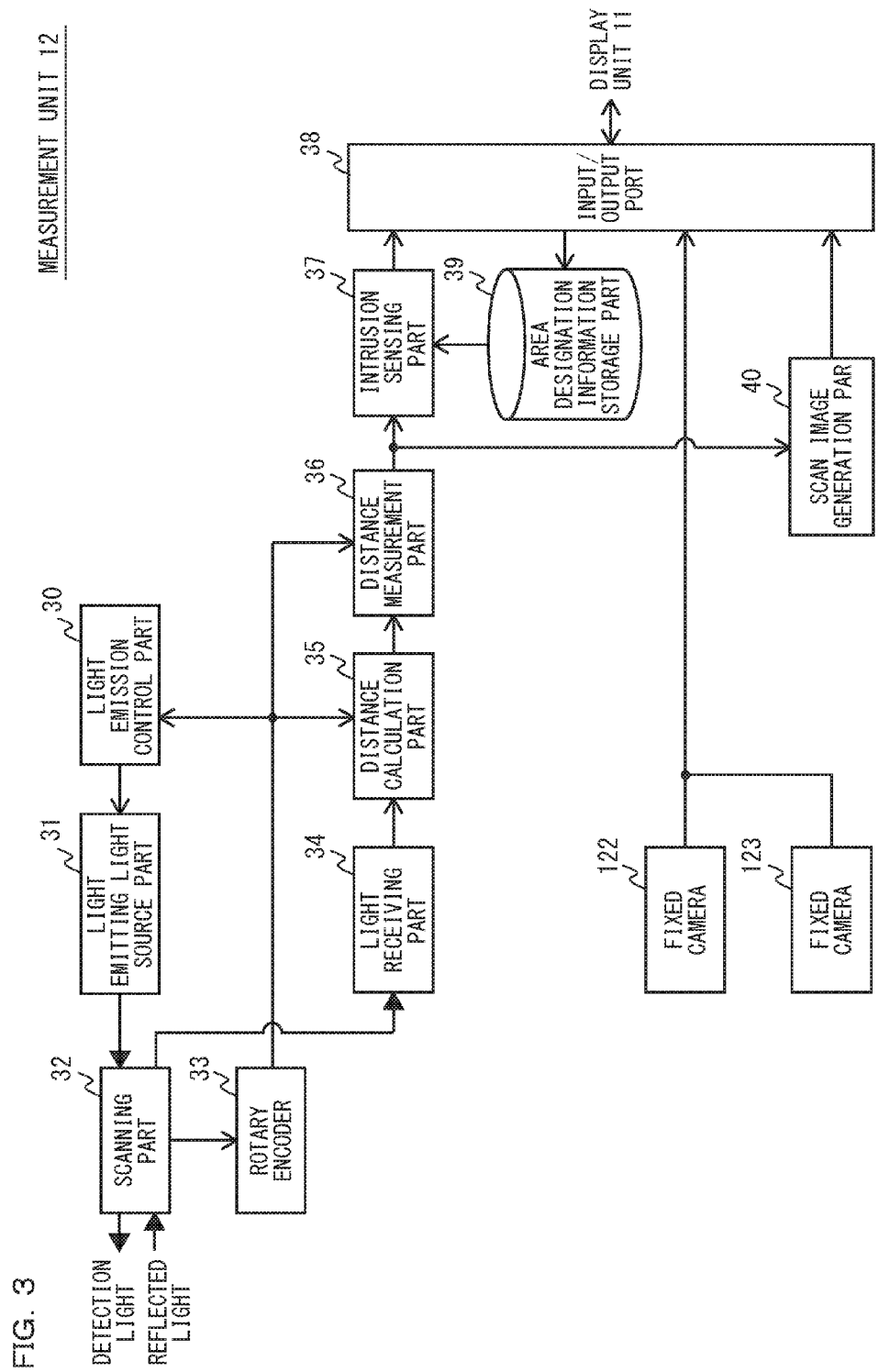
FIG. 3 is a block diagram illustrating an example of a functional configuration in a measurement unit of FIG. 2.

FIG. 3 is a block diagram illustrating an example of a functional configuration in the measurement unit 12 of FIG. 2. The measurement unit 12 includes a light emission control part 30, a light emitting light source part 31, a scanning part 32, a rotary encoder 33, a light receiving part 34, a distance calculation part 35, a distance measurement part 36, an intrusion sensing part 37, an input/output port 38, an area designation information storage part 39, a scan image generation part 40, and fixed cameras 122 and 123.

The light emitting light source part 31 includes a light emitting element such as a laser diode (LD) or a light emitting diode (LED) and generates detection light. The light emission control part 30 controls the light emitting light source part 31 so that the light emitting light source part 31 generates pulse-like detection light at a constant time interval. The scanning part 32 includes the rotary optical system which emits the detection light toward an object and causes the detection light to perform scanning in the circumferential direction around the rotation axis and a drive part which rotates the rotary optical system around the rotation axis. For example, the rotary optical system of the scanning part 32 includes an emitter mirror which reflects the detection light toward an object, a receiver lens which receives reflected light from the object, and a receiver mirror which reflects the reflected light transmitted through the receiver lens toward a light receiving element.

The light receiving part 34 includes a light receiving element such as a photodiode (PD), and receives reflected light from an object and generates a light receiving signal. The rotary encoder 33 is a rotation detection device which detects a rotation of the rotary optical system and generates a pulse signal whose pulse repetition interval corresponds to a rotation speed. The light emission control part 30 controls the light emitting light source part 31 on the basis of the pulse signal of the rotary encoder 33 to adjust an emission timing of the detection light. For example, every time the rotary optical system of the scanning part 32 rotates by 360/1000°, the detection light is emitted.

The distance calculation part 35 obtains a distance to the object on the basis of the light receiving signal from the light receiving part 34. The distance calculation part 35 is a measurement part which performs distance measurement by a time of flight (TOF) system. The distance calculation part 35 measures a receiving timing of the light receiving signal on the basis of the timing of the pulse signal of the rotary encoder 33 and identifies a delay time between when detection light is emitted and when reflected light corresponding to the detection light is received to calculate the distance to the object as a detection distance. The distance measurement part 36 obtains distance measurement information corresponding to the detection distance obtained by the distance calculation part 35 and a scanning angle of the detection light.

The intrusion sensing part 37 senses an intruder within the protection area on the basis of the distance measurement information of the distance measurement part 36 and outputs a sensing signal. The scanning angle of the detection light is identified on the basis of the pulse signal of the rotary encoder 33. Further, whether or not an intruder is present within the protection area is determined by identifying a two-dimensional position of the intruder from the detection distance and the scanning angle of the detection light and checking the identified two-dimensional position against positional information of the protection area. The sensing signal is transmitted to the display unit 11 through the input/output port 38.

Further, the intrusion sensing part 37 senses an intruder within the warning area on the basis of the distance measurement information of the distance measurement part 36. When sensing an intruder within the warning area, the intrusion sensing part 37 performs user notification. The warning area is an area to be a monitoring target of intruder sensing and designated within the detection area. The user notification is performed, for example, by lighting the indicator 112 in an indication mode different from the case when an intruder within the protection area has been sensed.

The input/output port 38 is a communication interface part which communicates with the display unit 11, and receives setting data from the display unit 11 and transmits an operating state, distance measurement information, a sensing signal, a scan image, and a camera image to the display unit 11. The area designation information storage part 39 holds area designation information which designates the protection area and the warning area. The area designation information includes positional information indicating the two-dimensional position of the protection area or the warning area, and is acquired from the display unit 11 through the input/output port 38.

The scan image generation part 40 generates a scan image on the basis of distance measurement information of the distance measurement part 36. The scan image is formed by two-dimensionally displaying a plurality of distance measurement information items obtained within a scanning period of the detection light. Each of the distance measurement information items is represented as a distance measurement position on the scanning plane 3 identified by the scanning angle and the detection distance. The scanning plane 3 is a plane perpendicular to the rotation axis of the rotary optical system of the scanning part 32. For example, the scan image is a moving image which is created on the basis of distance measurement information which is acquired when the reflected light is received, and updated synchronously with the scanning period of the detection light.

A scan image and camera images captured by the fixed cameras 122 and 123 are transmitted to the display unit 11 through the input/output port 38. The intrusion sensing part 37 transmits sensing information which includes a position of the sensed intruder (sensing position) and a time when the intruder is sensed (sensing time) to the display unit 11. For example, an operating time from when a main power is turned on can be used as the sensing time.

Although there is described an example of the safety scanner 10 in which one measurement unit 12 is connected to one display unit 11, a configuration in which a plurality of measurement units 12 can be connected to one display unit 11 may be employed. In this case, the OSSD of the display unit 11 is turned on when all the target measurement units 12 confirm that the OSSD should be turned on in the respective protection areas, and turned off in the other cases. The scan image generation part 40 provided in the measurement unit 12 enables the load of a scan image generation process to be distributed.

<Display Unit 11>

Figure 4:
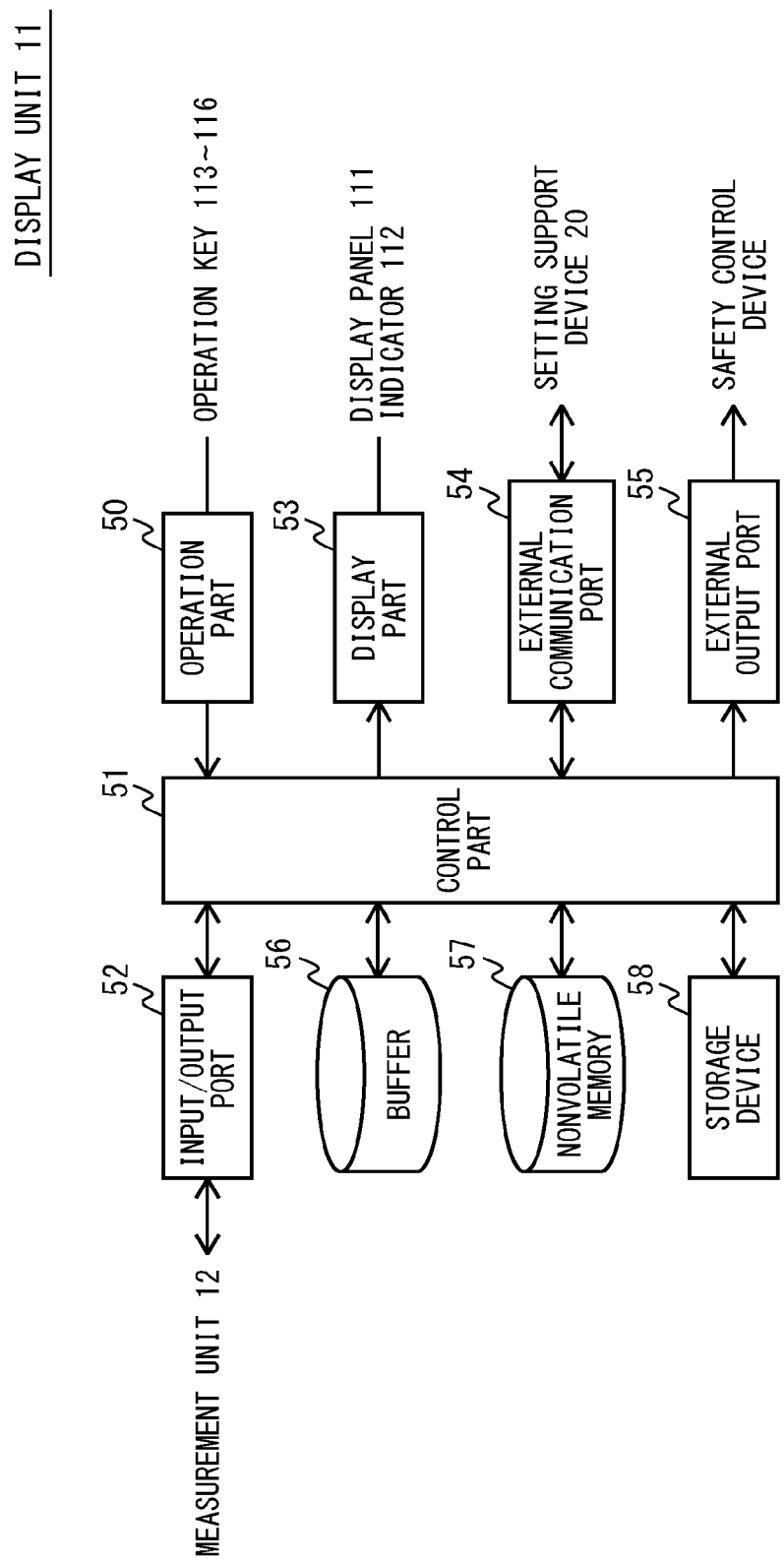
FIG. 4 is a block diagram illustrating an example of a functional configuration in a display unit of FIG. 2.

FIG. 4 is a block diagram illustrating an example of a functional configuration in the display unit 11 of FIG. 2. The display unit 11 includes an operation part 50, a control part 51, an input/output port 52, a display part 53, an external communication port 54, an external output port 55, a buffer 56, a nonvolatile memory 57, and a storage device 58.

The input/output port 52 is a communication interface part which communicates with the measurement unit 12, and transmits setting data including area designation information to the measurement unit 12 and receives an operating state, distance measurement information, a sensing signal, a scan image, and a camera image from the measurement unit 12.

The external communication port 54 is a communication interface part which communicates with the setting support device 20, and receives setting data from the setting support device 20 and transmits an operating state, distance measurement information, a scan image, and a camera image to the setting support device 20. The external output port 55 is an interface part which outputs an output signal (an on state or an off state) of the OSSD to the safety control device as a sensing signal (safety control signal). Note that the external output port 55 may be configured to transmit an output signal (an on state or an off state) of the OSSD to the safety control device as a sensing signal (safety control signal) by two-way communication with the safety control device.

The operation part 50 generates an operation signal in accordance with a depression operation of the operation keys 113 to 116 and outputs the operation signal to the control part 51. The display part 53 drives the display panel 111 and the indicator 112 to display setting data, an operating state, distance measurement information, a scan image, and a camera image on the display panel 111 and indicates an operating state on the indicator 112.

The display part 53 is a monitoring image display section which displays an output state of the sensing signal, a scan image, or a camera image on a monitor screen. The display part 53 displays the protection area or the warning area on the scan image. When the operation part 50 receives a switching instruction by an operation of the operation keys 113 to 116, the display part 53 switches a display image between the scan image and the camera image in accordance with the switching instruction. Further, the display part 53 displays a plurality of distance measurement positions on the camera image.

The control part 51 acquires distance measurement information, a scan image, and a camera image from the measurement unit 12 through the input/output port 52, and stores the acquired information and images in the buffer 56. When data accumulated in the buffer 56 exceeds a certain amount, the control part 51 overwrites the oldest data and stores new data. The buffer 56 is a volatile storage element for temporary recording which is incorporated in the safety scanner 10.

Further, the control part 51 acquires sensing information of an intruder from the measurement unit 12 and generates a sensing history on the basis of the sensing information. The sensing history includes a position of the sensed intruder (sensing position), a time when the intruder is sensed (sensing time), and a monitoring image corresponding to the sensing time, and these sensing information items are associated with each other and stored as the sensing history.

The monitoring image recorded as the sensing history includes a still image which is acquired immediately before or after the sensing time and a moving image whose acquisition period includes the sensing time. For example, the moving image is acquired around the sensing time and have a certain time length. Further, camera images captured by the fixed cameras 122 and 123 and a scan image generated by the scan image generation part 40 are used as these monitoring images.

For example, a user can select, in any manner, whether either a still image or a moving image is recorded as a sensing history or whether either a camera image or a scan image is recorded as a sensing history. A state before and after the sensing time can be easily identified by recording a moving monitoring image as a sensing history. On the other hand, the number of sensing histories that can be stored in the nonvolatile memory 57 can be increased by recording a still monitoring image as a sensing history.

The nonvolatile memory 57 is a nonvolatile storage element incorporated in the safety scanner 10. The nonvolatile memory 57 holds a sensing history created by the control part 51. The nonvolatile memory 57 is a sensing history storage section which stores a sensing position, a sensing time, and a monitoring image corresponding to the sensing time in association with each other as a sensing history. A peripheral state before and after the sensing time can be easily identified by checking the scan image stored as a sensing history. When area setting or a setting bank is changed, the control part 51 deletes the corresponding sensing history.

Instead of recording a scan image as a sensing history, a plurality of distance measurement information items obtained within a scanning period corresponding to the sensing time may be recorded as a sensing history, and a scan image may be created from the plurality of distance measurement information items recorded as the sensing history and displayed when the sensing history is displayed.

Further, warning related information may also be recorded as a sensing history in addition to information relating to a sensing signal (OSSD). The warning related information is information which is recorded in relation to an operation of performing user notification for warning when a predetermined sensing event occurs, and an occurrence time of the sensing event, the contents of the sensing event, and a warning factor are recorded as the sensing history.

The sensing event includes, for example, sensing of ambient light based on a light receiving signal from the light receiving part 34, sensing of a high reflector based on a light receiving signal from the light receiving part 34, sensing of dirt on the protective cover 121, sensing of an overcurrent in an output line of the safety scanner 10, and sensing of an object within the warning area. Note that the warning related information recorded as a sensing history may include a monitoring image (a still image or a moving image) corresponding to the occurrence time of the sensing event. Further, a user may be able to select, in any manner, whether or not warning related information of the monitoring image is recorded as a sensing history.

The storage device 58 includes a nonvolatile storage element and is detachably attached to the display unit 11. The storage device 58 holds setting data acquired from the setting support device 20. Note that the storage device 58 may hold the sensing history.

The control part 51 reads a sensing history from the nonvolatile memory 57 in accordance with a history request from an external device, that is, the setting support device 20, and transmits the read sensing history to the setting support device 20 through the external communication port 54. Although there is described an example of the safety scanner 10 in which the scan image generation part 40 is provided in the measurement unit 12, the scan image generation part 40 may be provided in the display unit 11 instead of this configuration. Alternatively, the scan image generation part 40 may be provided in each of the display unit 11 and the measurement unit 12. In this case, distance measurement information is transmitted and received between the measurement unit 12 and the display unit 11 instead of a scan image. Thus, even when a communication speed is low, a scan image is easily displayed.

When the input/output port 52 receives a capture signal by sensing of an intruder, the control part 51 reads a scan image in the buffer 56 in accordance with the capture signal and stores the read scan image in the nonvolatile memory 57 as history information. The scan image stored as history information is a scan image (moving image) whose acquisition period includes a receiving time of the capture signal.

Further, when the operation part 50 receives a capture signal by an operation of the operation keys 113 to 116, the control part 51 reads a scan image in the buffer 56 in accordance with the capture signal, and stores the read scan image in the nonvolatile memory 57 as a sensing history.

<Monitor Screen 6>

Figure 5:
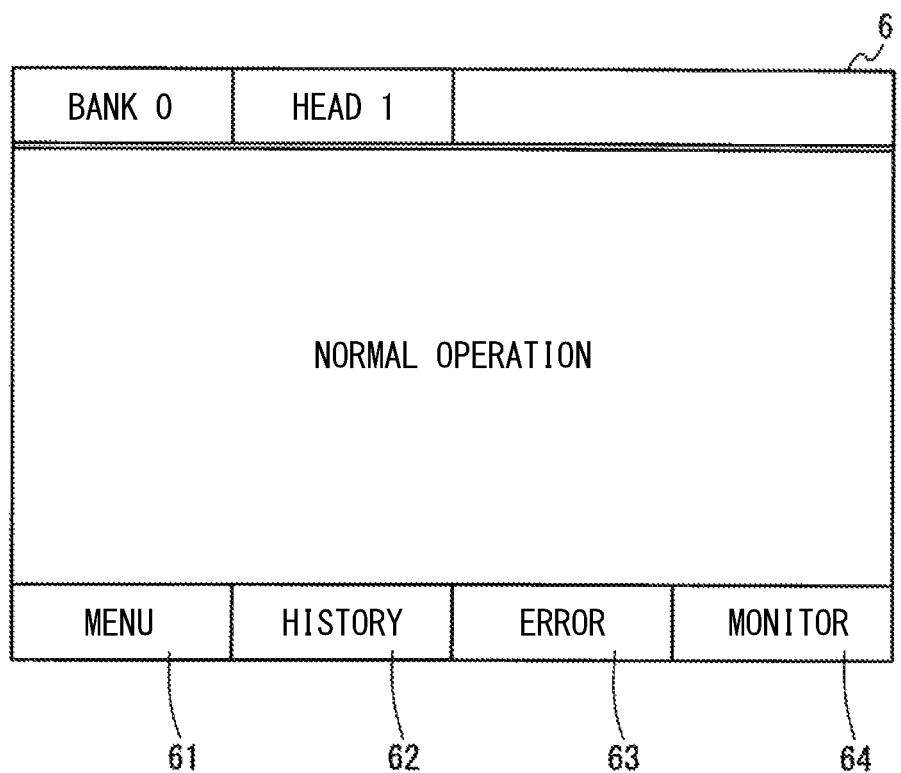
FIG. 5 is a diagram illustrating an example of the operation of the display unit of FIG. 4 and illustrates a monitor screen displayed on a display panel.
Figure 6A:
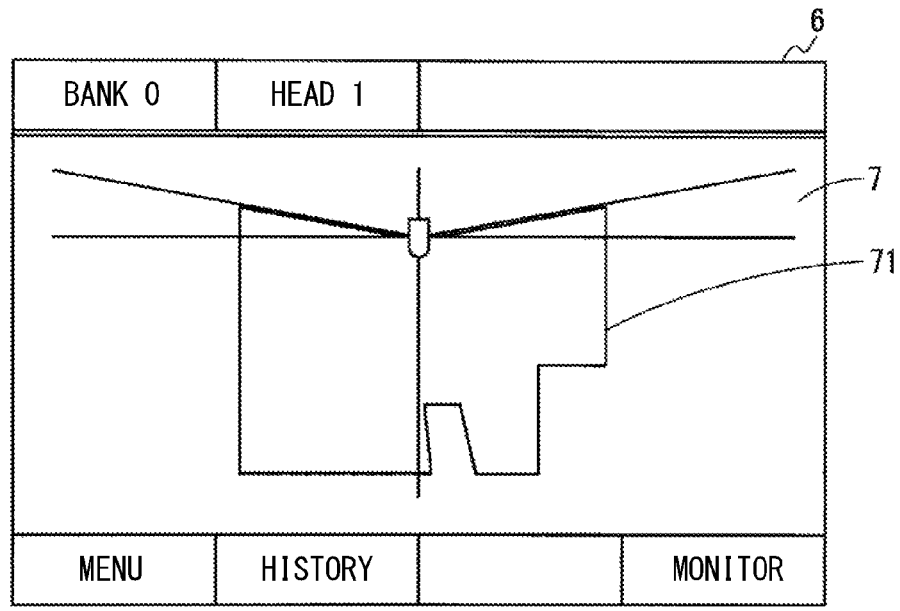
FIGS. 6A and 6B are diagrams illustrating an example of the operation of the display unit of FIG. 4 and illustrate the monitor screen which is displayed when a monitor button is operated.
Figure 6B:
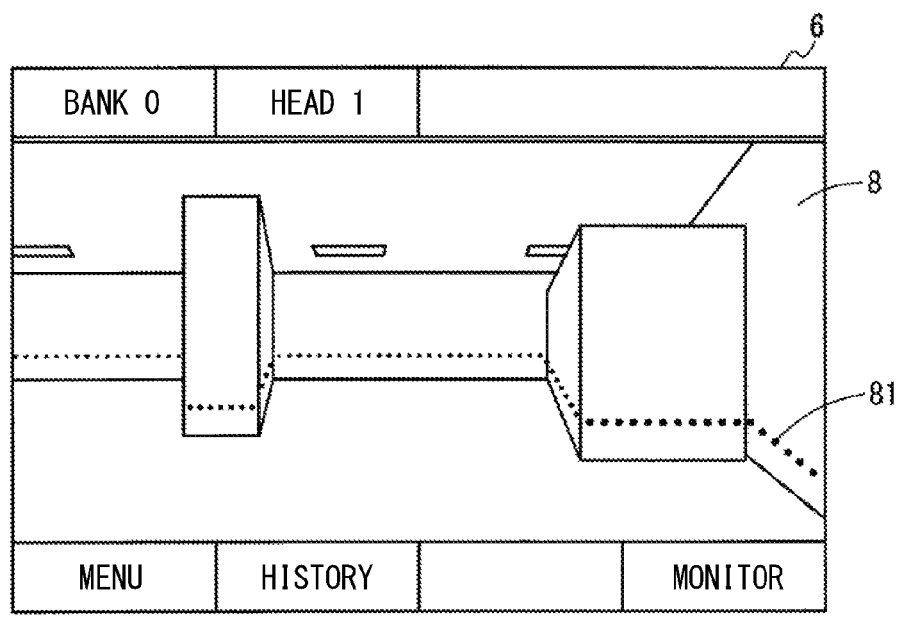

FIGS. 5, 6A and 6B are diagrams illustrating an example of the operation of the display unit 11 of FIG. 4 and illustrate a monitor screen 6 displayed on the display panel 111. FIG. 5 illustrates the monitor screen 6 which displays an output state of a sensing signal. The monitor screen 6 is a state display screen for displaying an operating state of the safety scanner 10, and a character string of "NORMAL OPERATION" which indicates an operating state is displayed in a main display field. It is possible to identify whether the current operating state is a normal operating state or an error state by viewing the monitor screen 6.

When a plurality of measurement units 12 are connected to the display unit 11, an operating state of one of the measurement units 12 selected as a display target is displayed on the monitor screen 6. Further, when the monitoring target area and the measurement condition are registered as a setting bank, and a bank function of switchably holding a plurality of setting banks is enabled, a bank number which indicates a setting bank applied to the display target measurement unit 12 is displayed within the monitor screen 6.

A head number which indicates the measurement unit 12 selected as a display target and a bank number are disposed above the main display field. Further, a menu button 61, a history button 62, an error button 63, and a monitor button 64 are disposed below the main display field.

The menu button 61 is a soft key corresponding to the operation key 113. Switching to a menu screen can be performed by operating the operation key 113. The menu screen is a screen for checking, for example, an error history, the measurement condition, the monitoring target area, and an input/output state.

The history button 62 is a soft key corresponding to the operation key 114. Switching to a history screen can be performed by operating the operation key 114. The history screen is a screen for displaying a sensing history of intruder sensing.

The error button 63 is a soft key corresponding to the operation key 115 and displayed when an error or an alarm occurs. Switching to an error screen can be performed by operating the operation key 115. The error screen is a screen for displaying a message or an error code indicating the contents of an error or an alarm. The monitor button 64 is a soft key corresponding to the operation key 116. Switching to another monitor screen 6 can be performed by operating the operation key 116.

FIGS. 6A and 6B illustrate the monitor screen 6 which is displayed when the monitor button 64 is operated. FIG. 6A illustrates the monitor screen 6 which displays a scan image 7 in the main display field. In this example, the scan image 7 is drawn with the lower direction of the monitor screen 6 aligned with the front direction of the measurement unit 12. A user who faces the front side of the safety scanner 10 can intuitively grasp the correspondence relationship between the distance measurement position on the scan image 7 and the position in a real space.

The scan image 7 is a monitoring image in which two-dimensional positions corresponding to distance measurement information items are indicated on a plane corresponding to the scanning plane 3. The scan image 7 is a line image in which a distance measurement line 71 which connects a plurality of distance measurement positions obtained within the scanning period of the detection light is indicated on the scanning plane 3. The distance measurement line 71 includes a polygonal line which chronologically connects a plurality of sequentially acquired distance measurement positions. For example, the distance measurement line 71 includes a polygonal line formed by plotting a distance measurement position corresponding to the detection distance for each constant scanning angle. Further, the scan image 7 is a moving image which is updated at a constant frame rate corresponding to the scanning period of the detection light.

Orthogonal coordinate axes which include the measurement unit 12 as an origin point, a y axis aligned with the front-rear direction, and an x axis aligned with the right-left direction are indicated on the scan image 7. Grid lines which are parallel to the coordinate axes may be displayed on the scan image 7. Further, the protection area or the warning area may be displayed on the scan image 7. The current state around the measurement unit 12 can be identified by viewing the scan image 7. The scan image 7 which is being displayed can be rotated or a display magnification thereof can be changed by operating the operation keys 113 to 116.

Figures 8A, 8B:
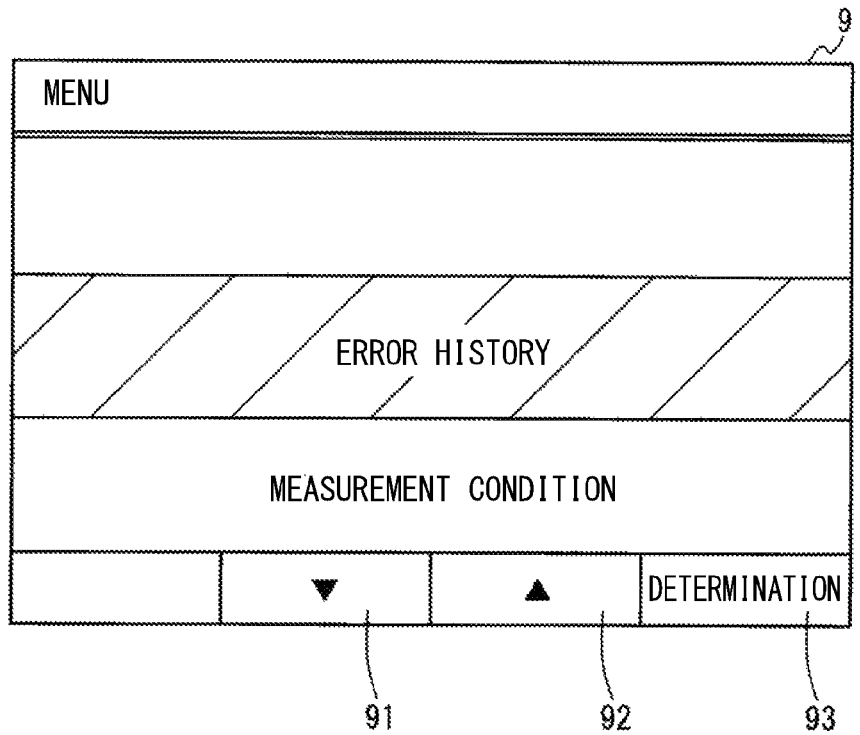
FIGS. 8A and 8B are diagrams illustrating an example of the operation of the display unit of FIG. 4 and illustrate a menu screen and a history screen which are displayed when a menu button is operated.

FIG. 8B illustrates the monitor screen 6 which displays a camera image 8 in the main display field. A display image can be switched between an output state of the sensing signal, the scan image 7, and the camera image 8 by operating the monitor button 64. The camera image 8 is a captured image captured by the fixed camera 122 or 123, and the current state around the measurement unit 12 is displayed as a moving image. In this example, a captured image acquired from the fixed camera 122 is displayed on the monitor screen 6 as the camera image 8.

The camera image 8 includes mechanical equipment, and a wall, a ceiling and a floor surface of a building as a subject. A plurality of distance measurement positions 81 which are obtained within the scanning period of the detection light are displayed on the camera image 8. Each of the distance measurement positions 81 is a two-dimensional position corresponding to distance measurement information on the camera image 8. For example, the distance measurement positions 81 include many dots formed by plotting a distance measurement position corresponding to the detection distance for each constant scanning angle.

The distance measurement positions 81 having such a configuration are displayed by identifying the position of an object in a three-dimensional space on the basis of the detection distance and the scanning angle of the detection light and identifying the two-dimensional position of the object in the camera image 8 on the basis of the positional relationship between the three-dimensional position and the angle of view of the cameras 122, 123. It is possible to check what kind of object an object on the scan image 7 is in the real space using the camera image 8 by superimposing the distance measurement positions 81 on the camera image 8.

The protection area or the warning area may be displayed on the camera image 8. The camera image 8 which is being displayed can be right-left reversed or a visual point thereof can be changed by operating the operation keys 113 to 116.

A detail check image or a privacy image may be used as an image displayed as the camera image 8. The privacy image is a display image having a lower image quality than the detail check image and created by mosaic processing of reducing the resolution of an image which is captured by the camera 122 or 123.

Various image filters can be employed in filter processing for obtaining the privacy image. For example, mosaic processing is performed on a camera image in such a manner that an image region is divided into many processing blocks, and a pixel value is replaced with a representative value for each pixel in the processing block to reduce a physical resolution so as to blur the image.

The shape and size of the processing block and the arrangement mode of the processing blocks can be designated in any manner. The representative value is a pixel value representing the processing block, and determined by an average value, a median value, or a mode value of pixel values relating to the pixels in the processing block.

Privacy of an operator who is included in the camera image 8 as an intruder can be protected or security information can be concealed by displaying such a privacy image. On the other hand, the environment around the safety scanner 10 and the subject can be analyzed in detail by displaying the detail check image. The camera image 8 stored as a sensing history is not filtered, and filtering processing is performed at the time of viewing the camera image.

Figure 7A:
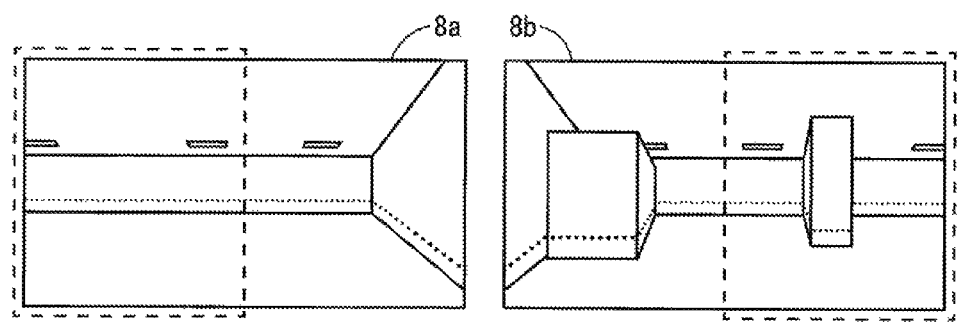
FIGS. 7A and 7B are diagrams illustrating an example of the operation of the display unit of FIG. 4 and illustrate a case in which two camera images are displayed side by side in a main display field.
Figure 7B:
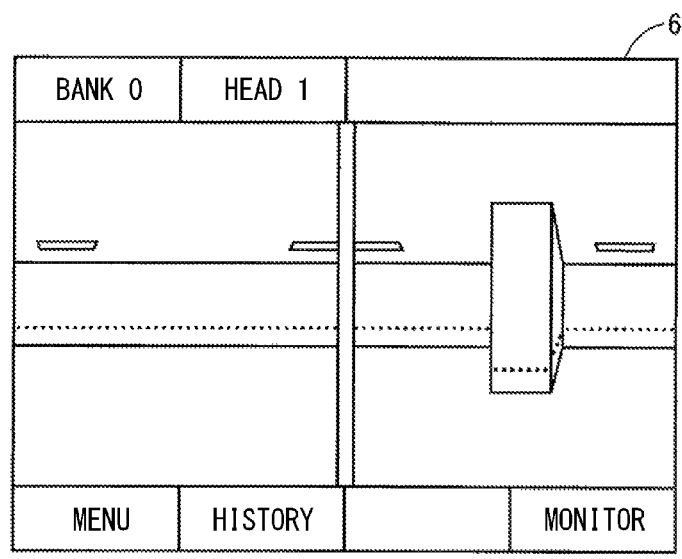

FIGS. 7A and 7B are diagrams illustrating an example of the operation of the display unit 11 of FIG. 4 and illustrates a case in which two camera images are displayed side by side in the main display field. FIG. 7A illustrates camera images 8*a* and 8*b* which are respectively captured by the fixed cameras 122 and 123. FIG. 7B illustrates the monitor screen 6 in which the camera images 8*a* and 8*b* are partially cut out and arranged in the main display field.

Either the camera image 8*a* which is captured by the fixed camera 122 (the left camera when viewed from the side facing the measurement unit 12) or the camera image 8*b* which is captured by the fixed camera 123 (the right camera when viewed from the side facing the measurement unit 12) can be switchably displayed in the main display field of the monitor screen 6.

Further, a region on the front side of the measurement unit 12 may be cut out from each of the camera images 8*a* and 8*b*, and the two cut-out partial images may be right-left reversed and displayed side by side in the main display field (FIG. 7B).

In this case, the left region of the camera image 8*a* which is captured by the left camera when viewed from the side facing the measurement unit 12 is arranged on the left side of the main display field, and the right region of the camera image 8*b* which is captured by the right camera when viewed from the side facing the measurement unit 12 is arranged on the right side of the main display field. A state of the measurement unit 12 in the front direction is easily intuitively recognized by such a coupling display function of the camera images 8*a* and 8*b*.

<Menu Screen, History Screen, and Check Screen>

FIG. 8A to FIG. 15 are diagrams illustrating an example of the operation of the display unit 11 of FIG. 4, and illustrate menu screens 9, 95, 98, history screens 94, 100, check screens 95*a*, 96, 97*a*, 97*b*, 130, 140, and an error help screen 144 which are displayed on the display panel 111.

FIG. 8A illustrates the menu screen 9 which is displayed when the menu button 61 is operated. The menu screen 9 is an item selection screen which displays menu items "ERROR HISTORY", "MEASUREMENT CONDITION", "AREA DESIGNATION INFORMATION", "INPUT/OUTPUT STATE", and "OTHERS" in the main display field and displayed by operating the menu button 61 in the monitor screen 6.

The menu items are arrayed in the up-down direction of the menu screen 9. One of the menu items located on the center of the screen is selected as a display target and displayed in a highlighted or focused manner. A down button 91, an up button 92, and a determination button 93 are disposed below the main display field.

The down button 91 is a soft key corresponding to the operation key 114. The up button 92 is a soft key corresponding to the operation key 115. A menu item to be a display target can be changed by operating the operation key 114 or 115. The determination button 93 is a soft key corresponding to the operation key 116. Switching to a screen corresponding to a menu item selected as a display target can be performed by operating the operation key 116.

FIG. 8B illustrates the history screen 94 which is displayed when the determination button 93 in the menu screen 9 is operated. The history screen 94 is a check screen for checking an error history, and a plurality of error histories are displayed in the main display field. The history screen 94 is displayed when the menu item "ERROR HISTORY" in the menu screen 9 is selected. The error histories are arrayed in the up-down direction of the history screen 94. Each of the error histories includes character strings indicating an error occurrence time, an error code, and error contents.

Figure 9A:
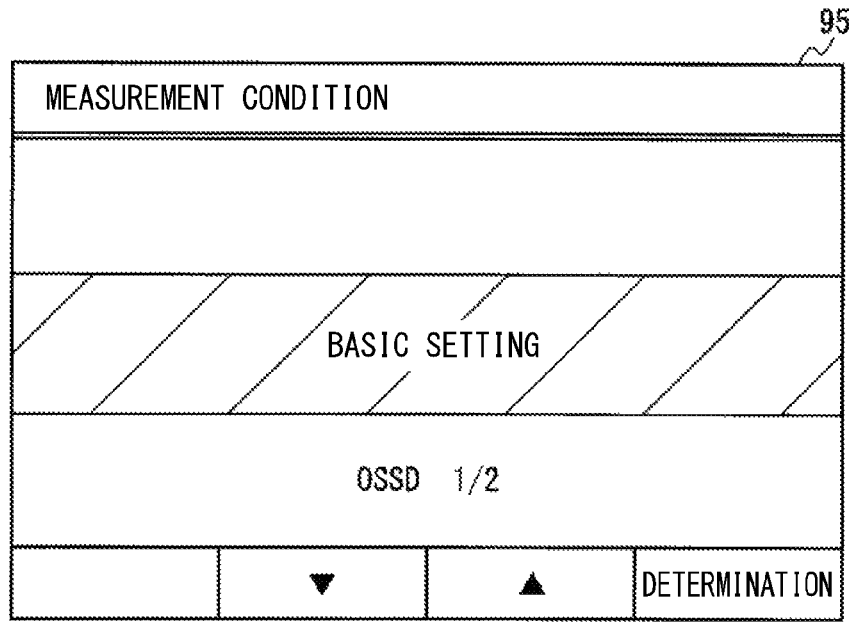
FIGS. 9A and 9B are diagrams illustrating an example of the operation of the display unit of FIG. 4 and illustrate a menu screen and a check screen which are displayed when a menu item "MEASUREMENT CONDITION" is selected.

FIG. 9A illustrates the menu screen 95 which is displayed when the menu item "MEASUREMENT CONDITION" in the menu screen 9 is selected. The menu screen 95 is an item selection screen which displays menu items such as "BASIC SETTING", "OSSD 1/2", "OSSD 3/4", "AREA SETTING", "BANK SETTING", "MUTING SETTING", "INPUT/OUTPUT SETTING", "HISTORY SETTING", AND "COMMUNICATION SETTING" in the main display field.

The menu items are arrayed in the up-down direction of the menu screen 95. One of the menu items located on the center of the screen is selected as a display target and displayed in a highlighted or focused manner. A menu item to be a display target can be changed by operating the down button 91 or the up button 92. Switching to a screen corresponding to a menu item selected as a display target can be performed by operating the determination button 93.

Figure 9B:
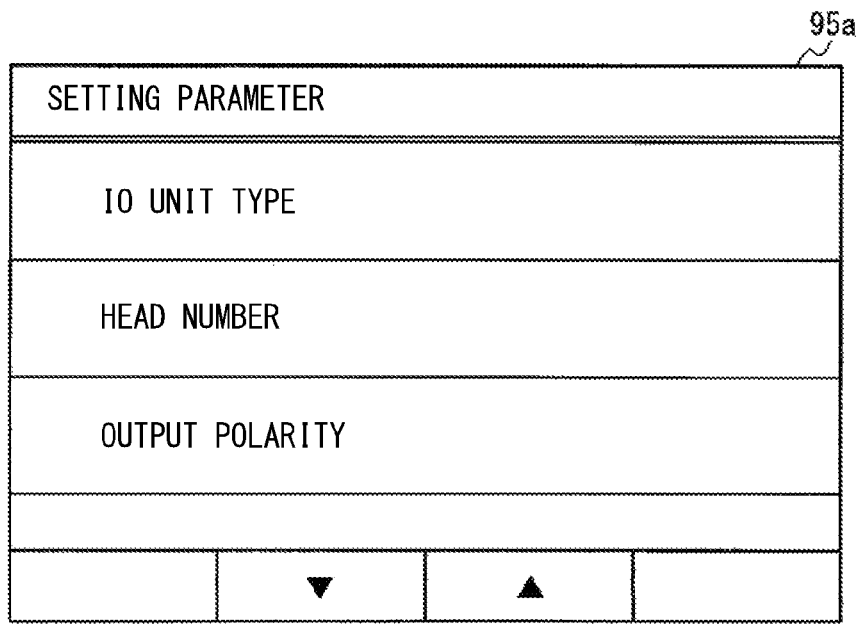

FIG. 9B illustrates the check screen 95*a* which is displayed when the determination button 93 in the menu screen 95 is operated. The check screen 95*a* is a screen for checking basic setting of the measurement condition and displayed when the menu item "BASIC SETTING" is selected. In the main display field of the check screen 95*a*, names and setting values of various setting parameters are displayed. The name of the setting parameter and the setting value thereof are alternately displayed.

Figure 10:
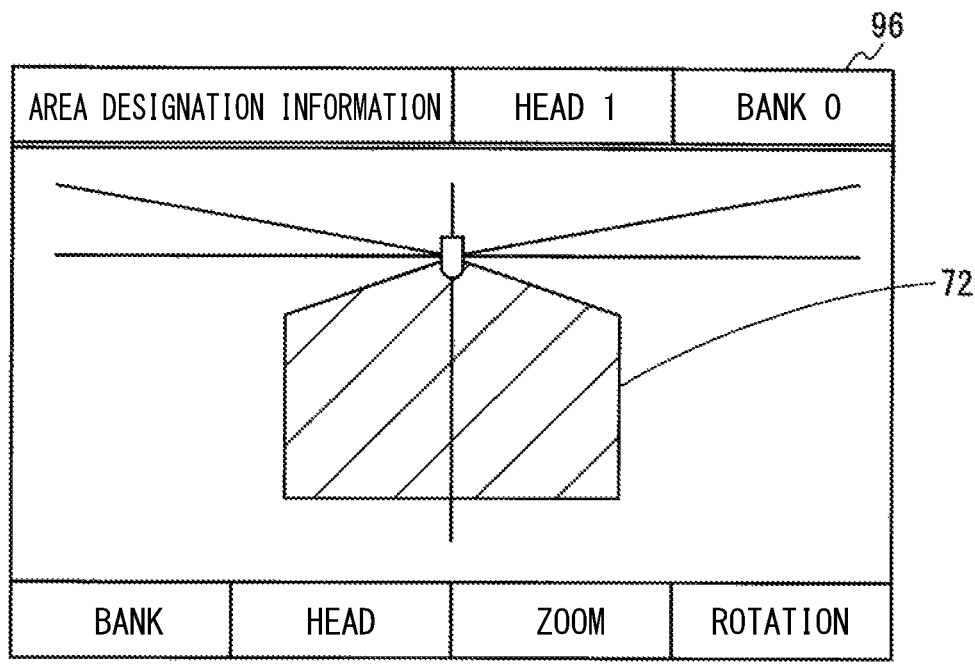
FIG. 10 is a diagram illustrating an example of the operation of the display unit of FIG. 4 and illustrates a check screen which is displayed when a menu item "AREA DESIGNATION INFORMATION" is selected.

FIG. 10 illustrates the check screen 96 which is displayed when the menu item "AREA DESIGNATION INFORMATION" in the menu screen 9 is selected. The check screen 96 is a screen for checking area designation information, and a figure representing the protection area 72 is displayed in the main display field. The protection area 72 is displayed on a plane corresponding to the scanning plane 3. Further, coordinate axes including the measurement unit 12 as an origin point are displayed.

FIG. 11A illustrates the check screen 97*a* which is displayed when the menu item "INPUT/OUTPUT STATE" in the menu screen 9 is selected. The check screen 97*a* is a screen for checking an input state of various signals. In the main display field, signal states of "INPUT 1" to "INPUT 10" are displayed.

FIG. 11B illustrates the check screen 97*b* which is displayed when a down button or an up button in the check screen 97*a* is operated. The check screen 97*b* is a screen for checking an output state of various signals. In the main display field, signal states of "OSSD 1/2", "OSSD 3/4", and "OUTPUT (AUX) 1" to "OUTPUT (AUX) 6" are displayed. Switching to the check screen 97*a* can be performed by operating a down button or an up button in the check screen 97*b*.

Figure 12:
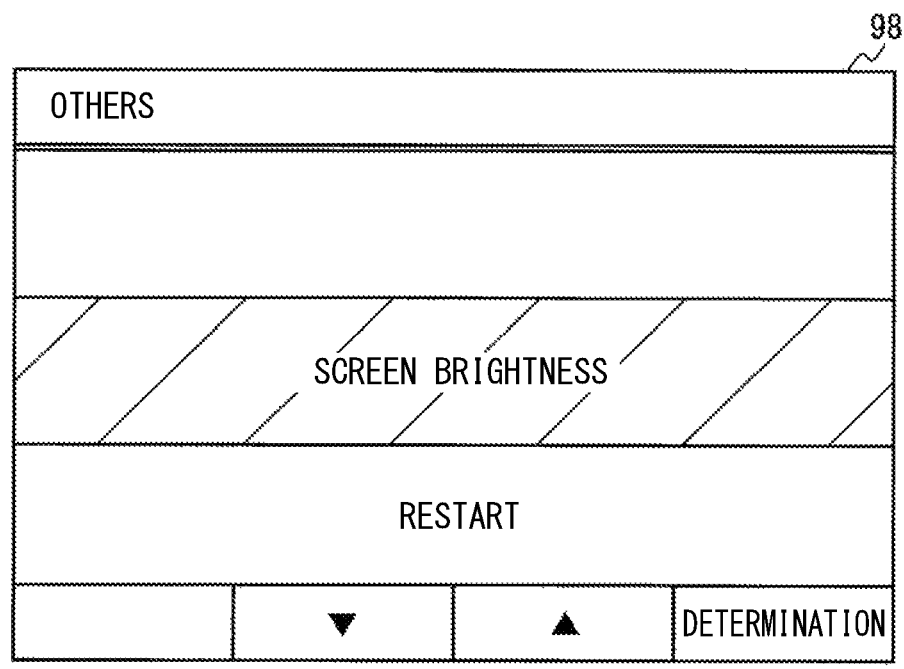
FIG. 12 is a diagram illustrating an example of the operation of the display unit of FIG. 4 and illustrates a menu screen which is displayed when a menu item "OTHERS" is selected.

FIG. 12 illustrates the menu screen 98 which is displayed when the menu item "OTHERS" in the menu screen 9 is selected. The menu screen 98 is an item selection screen for selecting menu items "SCREEN BRIGHTNESS" and "RESTART".

The brightness of the display panel 111 can be switched step by step by selecting the menu item "SCREEN BRIGHTNESS". Further, the safety scanner 10 can be restarted by selecting the menu item "RESTART".

Figure 13A:
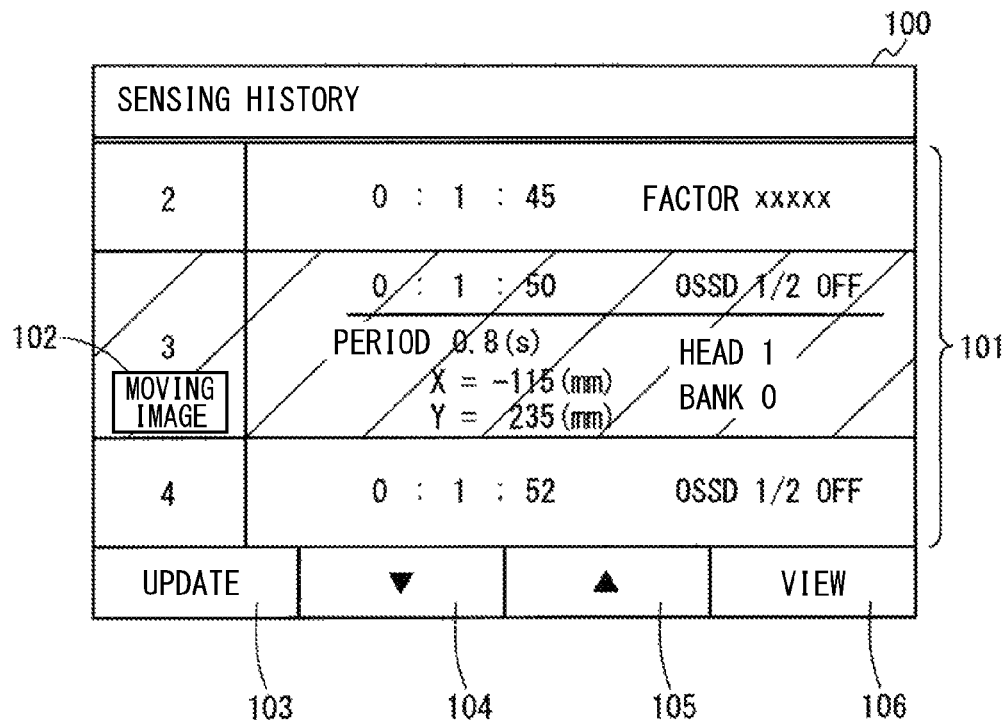
FIGS. 13A and 13B are diagrams illustrating an example of the operation of the display unit of FIG. 4 and illustrate a history screen and a check screen which are displayed when a history button is operated.

FIG. 13A illustrates the history screen 100 which is displayed when the history button 62 in the monitor screen 6 is operated. The history screen 100 is a check screen which displays a history list 101 including a plurality of sensing histories in the main display field. The history list 101 is a listing object in which two or more sensing histories having different sensing times are arrayed in the order of sensing time, and sensing information is displayed in association with each of the sensing histories.

For example, the history list 101 is partially displayed on the history screen 100 and can be scrolled up or down by operating a down button 104 or an up button 105. In this example, three sensing histories are arrayed in the up-down direction, and one of the sensing histories selected as a reference history is arranged on the center thereof. The reference history is displayed in a focused or highlighted manner.

A history number which indicates a sensing order, a sensing time, a sensing factor, a sensing period, a sensing position, a head number, and a bank number are displayed in the reference history. Further, an icon 102 which indicates that a moving monitoring image or a still monitoring image is recorded as a sensing history is displayed in the reference history which includes the scan image 7 or the camera image 8. On the other hand, a history number, a sensing time, and a sensing factor are displayed in a sensing history other than the reference history.

An update button 103, the down button 104, the up button 105, and a view button 106 are disposed below the main display field. The scan image 7 and the camera image 8 of the sensing history selected as the reference history can be checked by operating the view button 106 (the operation key 116). Further, the reference history can be shifted to a sensing history located before or after thereof by operating the down button 104 (the operation key 114) or the up button 105 (the operation key 115). Further, it is possible to acquire sensing information from the measurement unit 12 and update the sensing history in the nonvolatile memory 57 by operating the update button 103 (the operation key 113).

The history list 101 dynamically changes every time an event that should be left in the history occurs. However, when an event that should be left in the history occurs during checking of a sensing history, there are two cases in which it is desired to continuously view the sensing history which is being viewed and it is desired to view the newest sensing history. Thus, in the safety scanner 10, the display is updated to the newest history list 101 only when the update button 103 is pressed, and the history list 101 remains unchanged when the update button 103 is not pressed. Therefore, it is possible to prevent unintended moving down of the history order and unintended display of the newest history.

Figure 13B:
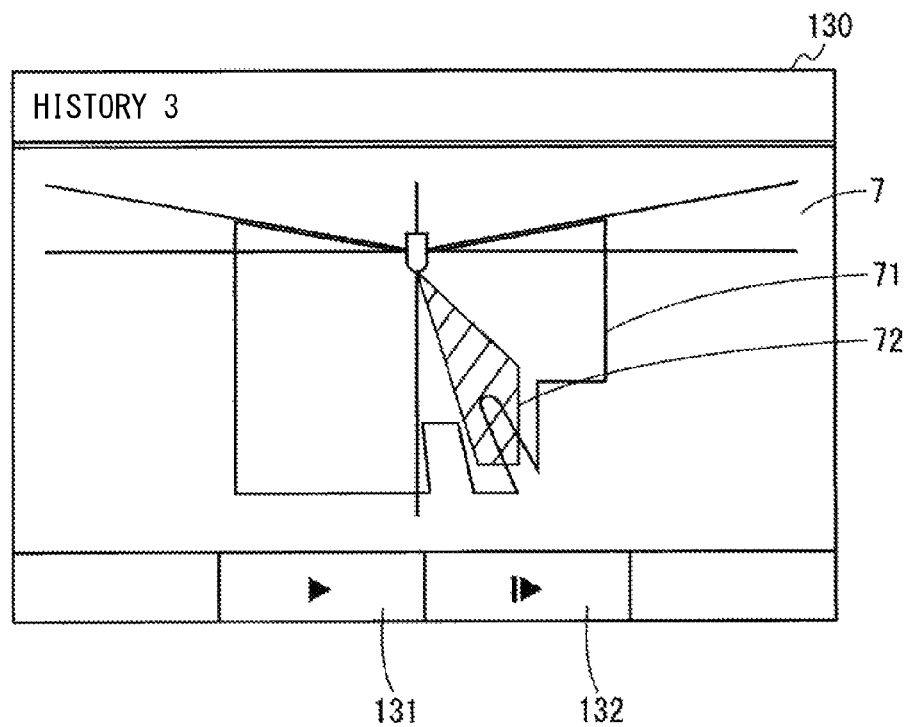

FIG. 13B illustrates the check screen 130 which is displayed when the view button 106 in the history screen 100 is operated. The check screen 130 is a screen for reproducing the scan image 7 or the camera image 8 which is recorded as the sensing history. In this example, a sensing history "HISTORY 3" is selected as the reference history, and the scan image 7 is displayed in the main display field.

A figure representing the protection area 72 is drawn on the scan image 7 in addition to the distance measurement line 71. Such a configuration enables easy comparison between the distance measurement position of an object and the protection area 72. Thus, it is possible to easily identify whether or not the safety scanner 10 is correctly installed or whether or not the safety scanner 10 is appropriately operating.

It is possible to start reproduction of a moving image or temporarily stop a moving image being reproduced by operating a reproduction button 131 (the operation key 114). Further, it is possible to frame-by-frame advance a moving image being reproduced by operating a frame advance button 132 (the operation key 115).

Figure 14:
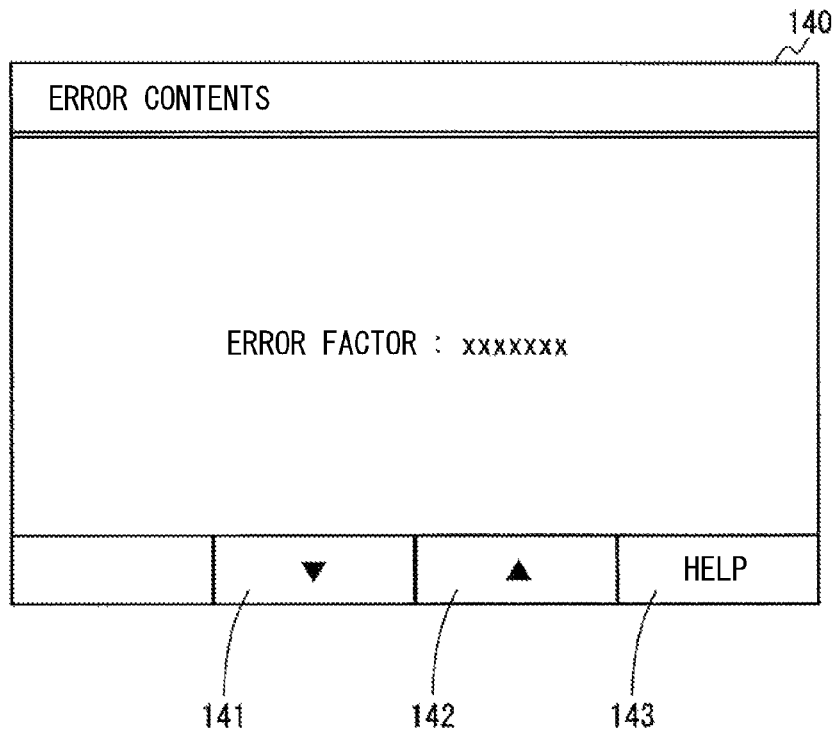
FIG. 14 is a diagram illustrating an example of the operation of the display unit of FIG. 4 and illustrates a check screen which is displayed when an error button is operated.

FIG. 14 illustrates the check screen 140 which is displayed when the error button 63 in the monitor screen 6 is operated. The check screen 140 is a screen for checking the contents of an error which is currently occurring, and a character string indicating the contents of an error or an alarm is displayed in the main display field. The contents of another error which is simultaneously occurring can be displayed by operating a down button 141 or an up button 142. The error help screen 144 is displayed by operating a help button 143.

Figure 15:
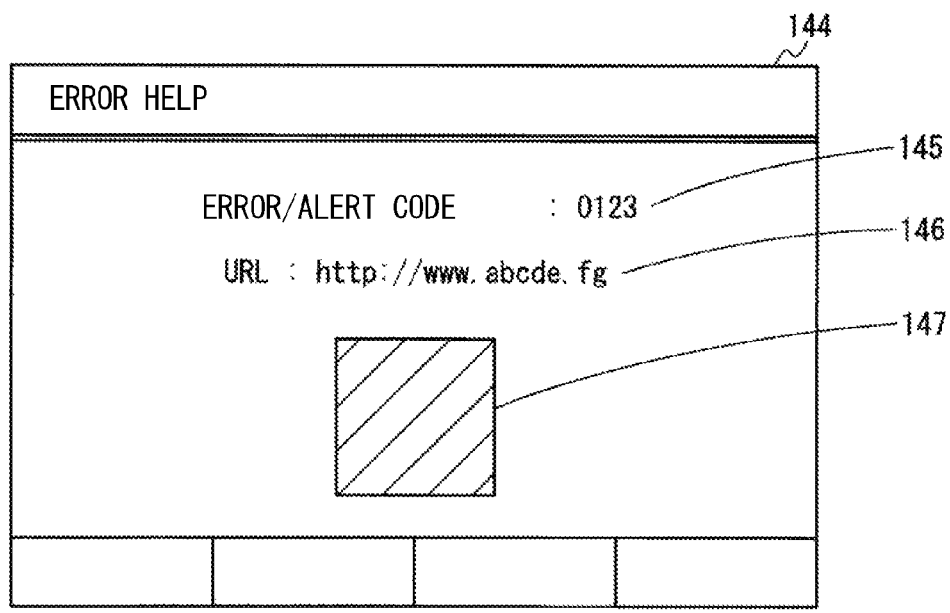
FIG. 15 is a diagram illustrating an example of the operation of the display unit of FIG. 4 and illustrates an error help screen which is displayed when a help button is operated.

FIG. 15 illustrates the error help screen 144 which is displayed when the help button 143 is operated. An identification code 145 for identifying the contents of an error or an alarm, and address information 146 and 147 of a web site which provides contents relating to the error or the alarm are displayed on the error help screen 144. The address information 146 is represented by a character string. The address information 147 is an optically readable image such as a two-dimensional code. Note that only either the address information 146 or 147 may be displayed on the error help screen 144.

A web browser on the setting support device 20 makes access to the web site of the designated address, downloads contents information from the web site, and displays the contents information on the display 21. When a user inputs the identification code 145 which identifies the contents of the error or the alarm on the web site, information including detailed explanation for the contents of the error or the alarm and a coping method is displayed on the web browser on the setting support device 20.

According to the present embodiment, the scan image 7 in which a plurality of distance measurement information items are indicated on the scanning plane 3 is displayed in the safety scanner 10. Thus, it is possible to check a plurality of distance measurement information items which are obtained by performing scanning with the detection light without connecting the safety scanner 10 to the setting support device 20. Therefore, it is possible to simplify an operation of checking an operating state such as whether or not the safety scanner 10 is correctly installed or whether or not the safety scanner 10 is appropriately operating.

Although, in the present embodiment, there is described an example in which the safety scanner 10 is provided with the fixed cameras 122 and 123, the present invention is also applicable to a safety scanner provided with no imaging section which captures an image of the detection area to generate a camera image.

What is claimed is:
1. A safety scanner comprising:
   a light emitter that emits a detection light to a detection area;
   a light receiver that receives the detection light reflected from an object within the detection area and generates a light receiving signal in accordance with the detection light;
   a distance calculation section configured to determine a distance to the object on the basis of the light receiving signal;
   a scanner configured to direct the detection light to the detection area to scan the detection area in a circumferential direction around a rotation axis;
   a distance measurement section that obtains a distance measurement information corresponding to the distance determined by the distance calculation section and a scanning angle of the detection light directed by the scanner;
   an intrusion sensing section that determines the presence or absence of an object into a protection area on the basis of the distance measurement information obtained by the distance measurement section to output a sensing signal corresponding to the presence or absence of the object into the protection area;
   an indicator lamp that indicates the sensing signal;

a scan image generation section that generates a scan image that includes a plurality of distance measurement information obtained by performing scanning with the detection light, the plurality of distance measurement information being represented as a plurality of distance measurement positions on a scanning plane of the detection light; and a monitoring image display that displays the scan image on a screen, wherein the scan image includes a line image formed of a polygonal line that chronologically connects the plurality of distance measurement positions that are sequentially acquired.

2. The safety scanner according to claim 1, wherein the monitoring image display displays the protection area on the scan image.

3. The safety scanner according to claim 1, further comprising:

an imaging section that captures an image of the detection area to generate a camera image; and a switching instruction receiving section that receives a switching instruction, wherein the monitoring image display switches a display image between the scan image and the camera image in accordance with the switching instruction.

4. The safety scanner according to claim 3, wherein the monitoring image display displays the plurality of distance measurement positions on the camera image.

5. The safety scanner according to claim 1, wherein the scan image includes a moving image, and the scan image generation section updates the scan image synchronously with a scanning period of the detection light.

6. The safety scanner according to claim 1, further comprising:

a capture signal receiving section that receives a capture signal; and a history information storage section that stores the scan image as a history information in accordance with the capture signal.

7. The safety scanner according to claim 1, wherein the monitoring image display displays the scan image with a lower direction of the screen aligned with a front direction of the safety scanner.

8. A safety scanner comprising:

a light emitter that emits a detection light to a detection area;

a light receiver that receives the detection light reflected from an object within the detection area and generates a light receiving signal in accordance with the detection light;

a distance calculation section configured to determine a distance to the object on the basis of the light receiving signal;

a scanner configured to direct the detection light to the detection area to scan the detection area in a circumferential direction around a rotation axis;

a distance measurement section that obtains a distance measurement information corresponding to the distance determined by the distance calculation section and a scanning angle of the detection light directed by the scanner;

an intrusion sensing section that determines the presence or absence of an object into a protection area on the basis of the distance measurement information obtained by the distance measurement section to output a sensing signal corresponding to the presence or absence of the object into the protection area;

an indicator lamp that indicates the sensing signal;

a scan image generation section that generates a scan image that includes a plurality of distance measurement information obtained by performing scanning with the detection light, the plurality of distance measurement information being represented as a plurality of distance measurement positions on a scanning plane of the detection light;

an imaging section that captures an image of the detection area to generate a camera image;

a switching instruction receiving section that receives a switching instruction, and a monitoring image display that displays the scan image on a screen, wherein the monitoring image display switches a display image between the scan image and the camera image in accordance with the switching instruction and the monitoring image display displays the plurality of distance measurement positions on the camera image.

9. The safety scanner according to claim 8, wherein the monitoring image display displays the protection area on the scan image.

10. The safety scanner according to claim 8, wherein the scan image includes a moving image, and the scan image generation section updates the scan image synchronously with a scanning period of the detection light.

11. The safety scanner according to claim 8, further comprising:

a capture signal receiving section that receives a capture signal; and a history information storage section that stores the scan image as a history information in accordance with the capture signal.

12. The safety scanner according to claim 8, wherein the monitoring image display displays the scan image with a lower direction of the screen aligned with a front direction of the safety scanner.

* * * * *